United States Patent
Marcus et al.

(10) Patent No.: US 8,805,326 B2
(45) Date of Patent: Aug. 12, 2014

(54) PAYMENT TRANSACTIONS ON MOBILE DEVICE USING MOBILE CARRIER

(75) Inventors: David Marcus, Menlo Park, CA (US); Hill Ferguson, San Francisco, CA (US)

(73) Assignee: Ebay Inc., San Jose, CA (US)

( * ) Notice: Subject to any disclaimer, the term of this patent is extended or adjusted under 35 U.S.C. 154(b) by 0 days.

(21) Appl. No.: 13/467,799

(22) Filed: May 9, 2012

(65) Prior Publication Data

US 2012/0289188 A1 Nov. 15, 2012

Related U.S. Application Data

(60) Provisional application No. 61/484,400, filed on May 10, 2011.

(51) Int. Cl.
*H04M 11/00* (2006.01)
*G06Q 20/00* (2012.01)
*G06Q 40/00* (2012.01)
*G06Q 30/00* (2012.01)

(52) U.S. Cl.
USPC ............. 455/406; 705/16; 705/44; 705/76; 705/26.1

(58) Field of Classification Search
USPC ..................................... 455/406
See application file for complete search history.

(56) References Cited

U.S. PATENT DOCUMENTS

| | | | |
|---|---|---|---|
| 2006/0253389 A1* | 11/2006 | Hagale et al. | 705/39 |
| 2007/0175978 A1* | 8/2007 | Stambaugh | 235/379 |
| 2008/0014931 A1* | 1/2008 | Yared et al. | 455/432.3 |
| 2010/0145861 A1* | 6/2010 | Law et al. | 705/76 |
| 2010/0153227 A1* | 6/2010 | Medvinsky et al. | 705/26 |
| 2010/0216425 A1* | 8/2010 | Smith | 455/406 |
| 2011/0093351 A1* | 4/2011 | Afana | 705/16 |
| 2011/0295750 A1* | 12/2011 | Rammal | 705/44 |
| 2012/0084210 A1* | 4/2012 | Farahmand | 705/64 |

* cited by examiner

*Primary Examiner* — Timothy Pham
(74) *Attorney, Agent, or Firm* — Haynes and Boone, LLP

(57) ABSTRACT

A user makes a purchase request through a merchant app on a mobile device, such as by selecting an item for purchase. A mobile SDK of a payment provider is installed in the merchant app. The payment request includes the phone number for the mobile device. The payment provider verifies the phone number of the user and requests approval of the payment from a mobile operator providing wireless communication services on the mobile device. If the request is approved, the payment is charged to the user mobile operator account. The user simply taps a button to select an item to purchase and selects another button to confirm the purchase. Once processing is done, the user is notified on the mobile device of a successful payment.

11 Claims, 6 Drawing Sheets

PAYMENT TRANSACTIONS ON MOBILE DEVICE USING MOBILE CARRIER

CROSS REFERENCE TO RELATED APPLICATION

The present application is related to and claims priority to U.S. Provisional Patent Appl. Ser. No. 61/484,400, filed May 10, 2011, which is incorporated by reference in its entirety.

BACKGROUND

Consumers are using mobile devices, such as smart phones and computing tablets, in an ever-increasing number of ways other than traditional voice communications between two users. For example, consumers are able to access the Internet, such as through mobile Internet applications (apps), watch programs, listen to music, etc. More recently, consumers are able to make payments using their mobile device, which provides an advantage of the consumer not having to carry physical funding instruments, such as credit cards, cash, and debit cards.

However, due in part to security concerns, many mobile payment processes can be time-consuming and inconvenient. For example, the consumer may need to first be authenticated by a payment provider, such as by entering a user identifier like a user name, email address, or phone number, and a PIN or password. The consumer may also need to select a funding source or even enter funding source information, such as a credit card number. Additional information may further be required from the consumer before a payment can be processed and made. Furthermore, the overall processing time from payment request initiation to payment completion may be relatively time-consuming due to processing by the payment provider.

Therefore, there is a need for a fast and easy way for a consumer to make a payment using a mobile device that overcomes the disadvantages of conventional methods discussed above.

SUMMARY

In one embodiment, a mobile payment application is installed in a merchant or seller application (app) on a user mobile device, where the mobile payment app may be from a service or payment provider. When the user is in the merchant app, the user is able to see and purchase specific items (including digital goods) and services from the merchant. By tapping or otherwise selecting a payment button or link, the user mobile device communicates the request to purchase to the service provider, where the request includes the user's mobile phone number.

The service provider then generates a one-time token and sends the token to the user mobile device using the received mobile phone number. The mobile payment app on the phone receives the one-time token and verifies its authenticity by sending it back to the service provider through the user mobile device.

The service provider then communicates the purchase request to a mobile carrier or operator of the user's mobile device, i.e., the entity providing mobile device wireless communication services for the user. The mobile carrier then processes the purchase request, which includes the payment amount and one or more of merchant information and item/service information, and approves or declines the payment request. The approval or decline is communicated to the service provider, which then communicates a notification to the user mobile device and to the merchant app.

As a result, if the payment request is approved, the user may receive the item or service quickly and easily through a single touch or selection on the user mobile device. Because the service provider knows the user's phone number, that information can be used to process the payment request without additional user input.

These and other features and advantages of the present disclosure will be more readily apparent from the detailed description of the embodiments set forth below.

Figure 1:
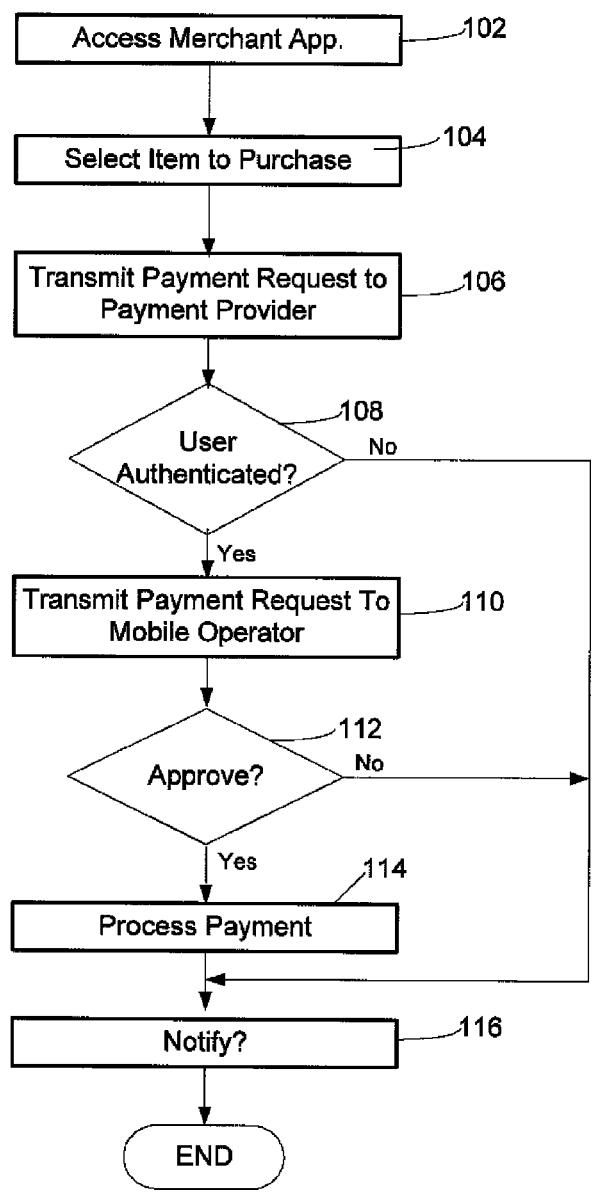
FIG. 1 is a flowchart showing a method of making a payment from a mobile device using a mobile operator account according to one embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

FIG. 1 is a flowchart 100 showing a method of making a payment from a mobile device using a mobile operator account according to one embodiment. At step 102, a consumer or user of the mobile device accesses a merchant application (app) on the mobile device. The mobile device may be a smart phone, computing tablet, or other computing device having mobile communication capabilities. The merchant app may be associated with any merchant or seller that provides items (including digital goods) and/or services (referred to generally as items) to the user for purchase. The merchant app allows the user to select the app from the user device, such as by tapping, to view items available for purchase within the app.

Within the merchant app is a mobile software development kit (SDK) from a service or payment provider, such as Zong. The mobile SDK is a client library that can be installed in a mobile application that runs on any mobile-connected device. The mobile SDK allows a user to make a payment through the merchant app utilizing the services of the payment provider. For example, a mobile SDK from the payment provider may be downloaded or installed in many different merchant apps on a user mobile device.

While in the merchant app, the user may see an item the user wishes to purchase. The item may be a digital good visible on a display of the user device, such as while the user is playing or engaged in a game. The item may also be part of a shopping page or other content display. If the uses wishes to purchase the item, the user can select the item, at step 104, on the user device. Item selection may include tapping on a button or link associated with the item, where the button includes an indication to purchase the item, price of the item, description or information about the item, and/or other information as appropriate.

Selecting the item may then display to the user on the user device information or additional information about the item, including a billing number and a confirmation to buy button. For example, the previous content screen may be replaced by a screen with a description of the item to be purchased, the amount, a phone number the purchased will be billed to, and a button or link the user can select to confirm or buy the item. This information page, in another embodiment, may be a pop up or overlay of the content screen, which allows the user to remain on the main content page while the payment is being processed.

Once the item is selected for purchase by the user, a payment request is electronically communicated or transmitted, at step 106, to the payment provider from the user device. The payment request may include the mobile number associated with the user device or other device identifier. Other information in the payment request may include the amount of the item being purchased and a description of the item. Merchant information may also be conveyed automatically because the mobile SDK is run from within the merchant app.

At step 108, a determination is made whether the user can be authenticated or verified. This may include determining whether the number contained in the payment request matches a phone number associated with the user with the payment provider. A user may be required to have an account with the payment provider, which would include the payment provider having stored information about the user, such as the mobile number(s) associated with user device(s), user name, billing address, user identifier, and/or a password or PIN.

As part of the authentication process, the payment provider may generate a one-time use token and transmit the token to the user's messaging port on the user device. In one embodiment, the token includes a unique identifier, which may be stored and associated with the transaction or payment request. The token is received by the mobile SDK in the merchant app, which then verifies the token's authenticity, which may occur after the SDK remits it to the payment provider. The token is transmitted back to the payment provider to confirm or authenticate the user. Thus, in one embodiment, the payment provider sends the token to the phone number that is requesting the billing. The SDK then remits the token to payment provider so payment provider can verify that it is authentic. If so, the billing event occurs.

If the user cannot be authenticated, a notification is sent, at step 116. The notification may be sent electronically to the user device that made the payment request or to another user device on record for the user. The notification may include a message, such as through text or voice, that the payment request has been denied.

However, if the user is authenticated, the payment provider transmits, at step 110, the payment request to a mobile operator or carrier. The mobile operator is a wireless service provider providing communication services, such as voice, text, and data, for the user through the user mobile device. Examples of a mobile operator include Verizon Wireless, AT&T Mobility, Sprint, Cox Wireless, and Sprint Nextel.

The payment request received by the mobile operator may include an amount, and an identifier for a user account with the mobile operator, such as a mobile number. Additional information may be included as appropriate or desired, such as merchant information, item information, etc.

At step 112, the mobile operator may determine whether the payment request is approved or denied. The mobile operator may access the user's account with the mobile operator to determine whether there are any restrictions, limitations, or other information that would affect the payment request. For example, the account may be past due, such that any payment requests on the account would be denied. The account may also have a limit or maximum as to an individual or total amount. If the payment request is higher than this limit, the request may be denied. These and other factors, such as any risk analysis, may contribute to the decision whether to approve or deny the payment request.

If the payment request is denied, mobile operator may communicate the decision to the payment provider, who in turn, may communicate the decision to the user device. In other embodiments, the mobile operator may communicate the decision to the user device directly. Thus, the user is notified, at step 116, when the payment request is denied.

However, if, as determined at step 112, the payment request is approved by the mobile operator, the payment may be processed at step 114. Processing may include the mobile operator adding the charge or amount to the mobile account of the user. A merchant account may be credited the purchase amount, either by the mobile operator or the payment provider. If the latter, the payment provider may debit an account or otherwise bill the mobile operator the appropriate amount.

The payment provider may then notify, at step 116, the user and/or the merchant. For example, the payment provider may send a mobile payment confirmation to the user's mobile device and to the merchant app, either separately or through the mobile SDK. A digital receipt may also be sent to the user's mobile device.

The user may then receive the benefits of the purchased item. For example, the benefit may be immediate if the item is a digital good or some time in the future if the item is a physical good to be delivered to or picked up by the user or a service to be used by the user at a later date. Advantageously, the user can make a payment on the user's mobile device with a single touch or tap of the user device (a first touch may select the item for purchase).

Note that one or more of the steps described above may be omitted, combined, or performed in a different order as desired and appropriate.

Figure 2A:
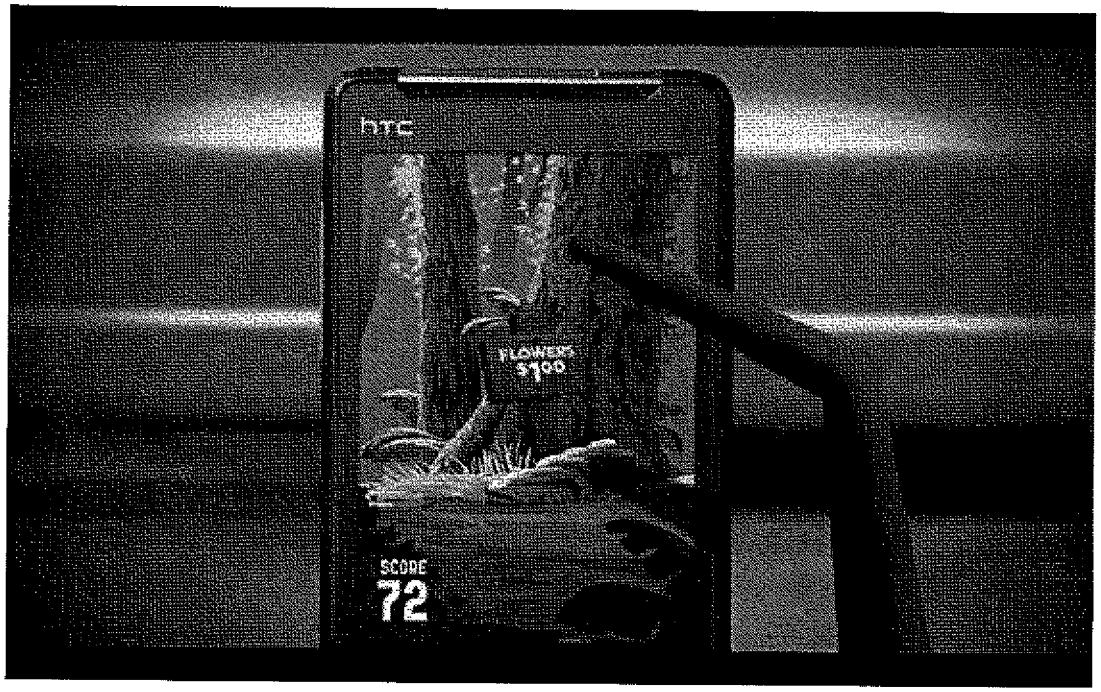
FIGS. 2A-2E are exemplary screen shots showing a process for making a payment from a mobile device using a mobile operator account according to one embodiment.

FIGS. 2A to 2E are exemplary screen shots showing a process for making a payment from a mobile device using a mobile operator account according to one embodiment. In FIG. 2A, the user sees an item available for purchase on a display of a user device, which is shown as a smart phone. The item for purchase is a flower package for $1.00, which is offered as part of a video game on the user device. The user can tap or otherwise select the portion of the display showing the item (i.e., the sign indicating flowers for $1.00).

Figure 2B:
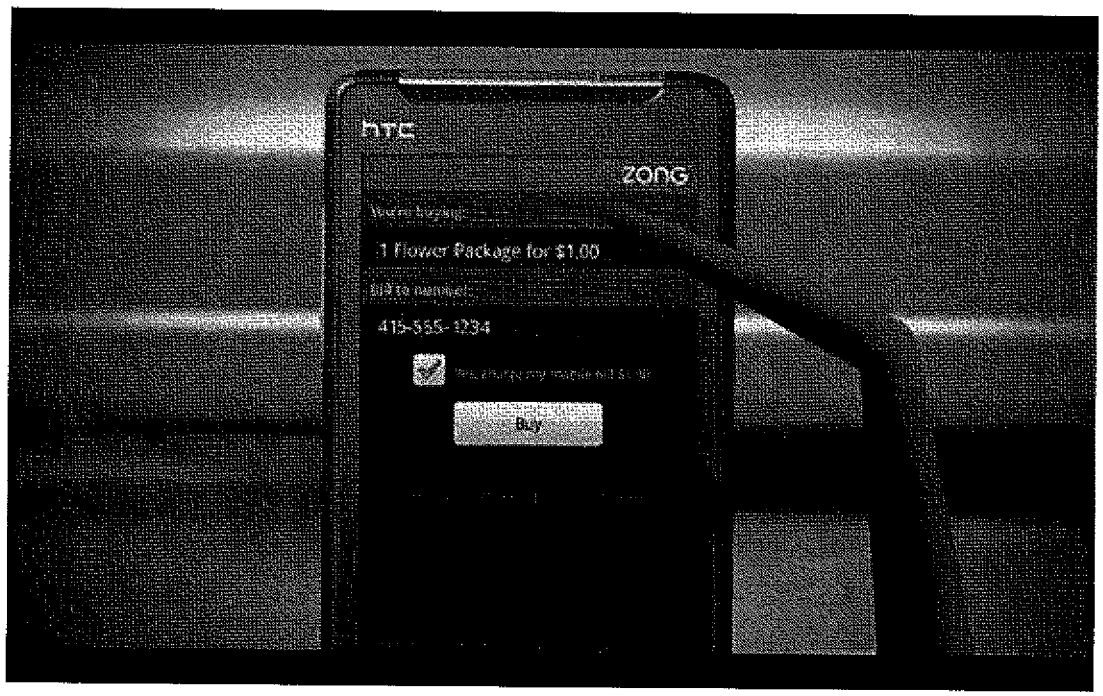

After selecting the item, the user sees a payment screen in FIG. 2B. The payment screen includes a description of the item to be purchased (one flower package for $1.00), a number to be charged to (which is typically the number of the user's mobile device), and a "Buy" button that the user can select to confirm or make the purchase.

Figure 2C:
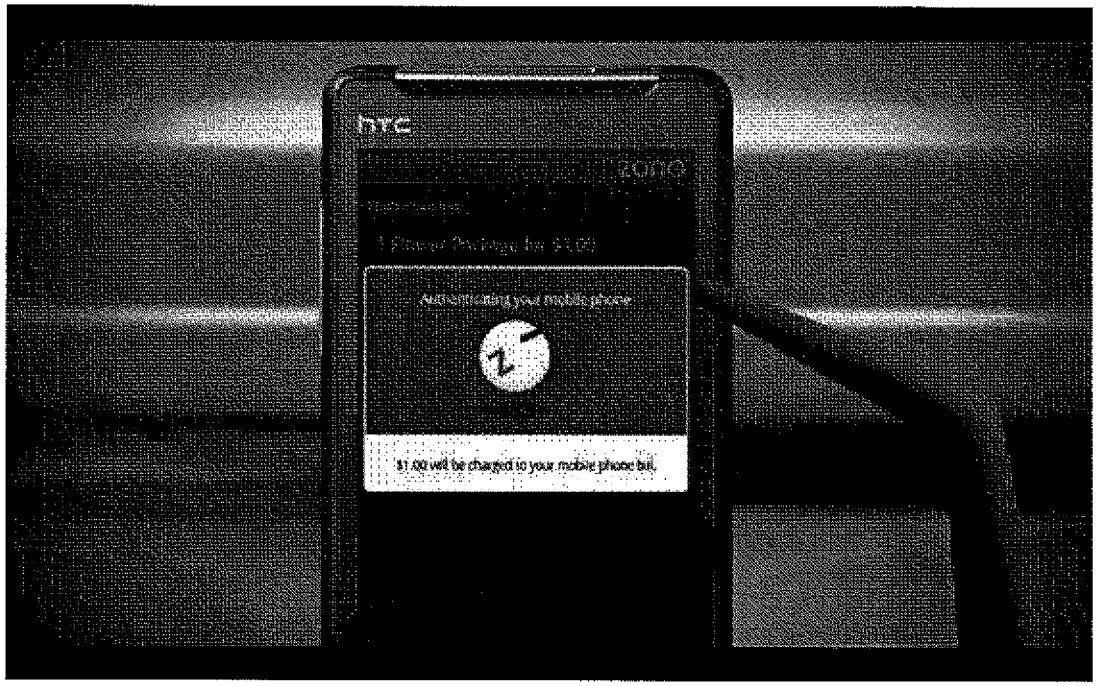

Once the user taps the "Buy" button, the user sees, in FIG. 2C, an overlaid pop-up screen indicating to the user that the payment provider is authenticating the mobile phone and that the purchase amount ($1.00) will be charged to the user's mobile phone bill.

Figure 2D:
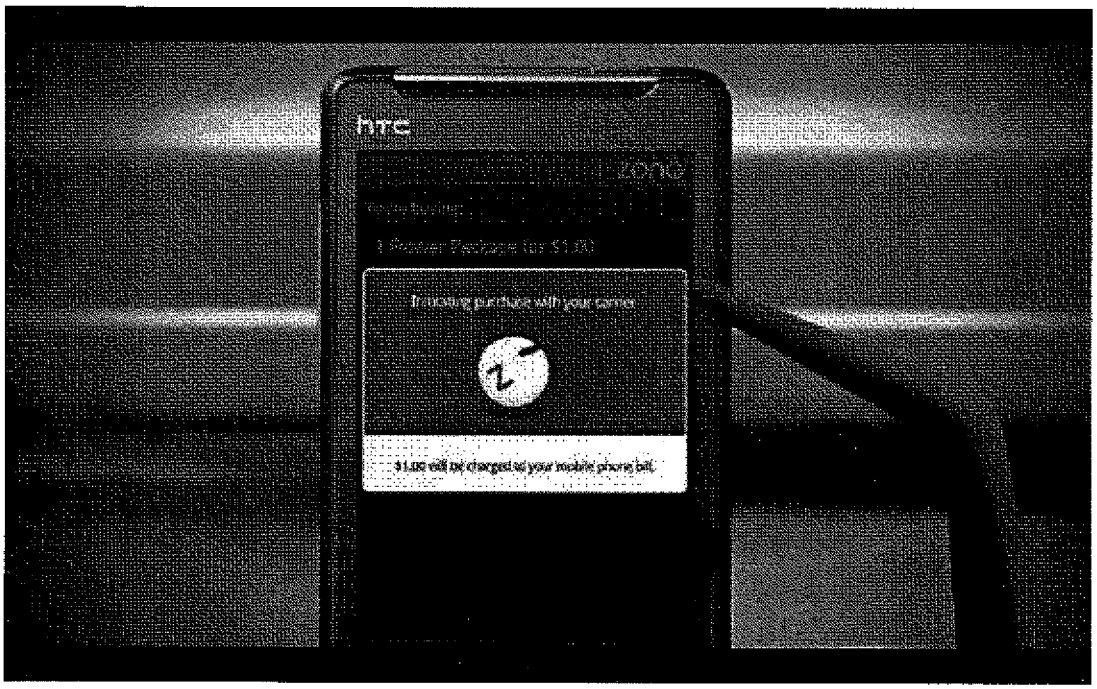

After the phone number has been authenticated, the user sees another overlaid pop-up screen indicating to the user that the purchase is being initialized with the user's wireless mobile carrier or operator, as shown in FIG. 2D.

Figure 2E:
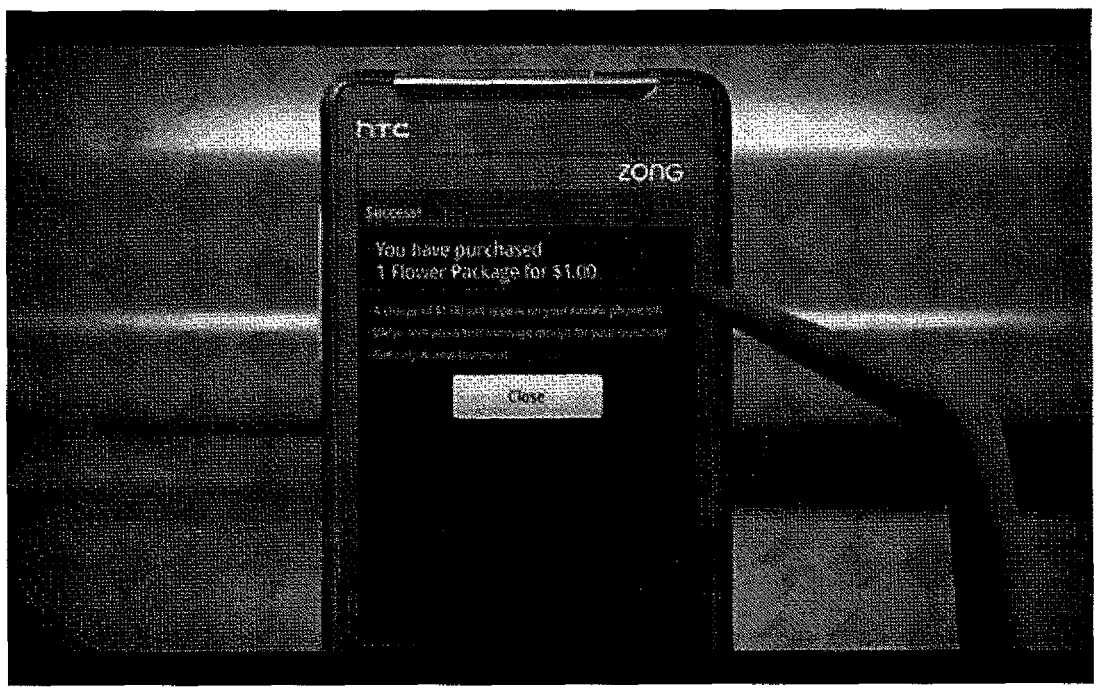

Finally, at FIG. 2E, the user is notified of a successful or approved payment, with details of the purchase and informing the user of a specific amount charged to the user's mobile phone bill, along with other information, such as a text receipt was sent and that additional information can be obtained the payment provider web site. The user can then select or tap the "Close" button to return to the game in FIG. 2A, but without the $1.00 for flowers sign. In fact, the flowers will now be part of the game display as a result of the one-touch purchase made by the user.

Figure 3:
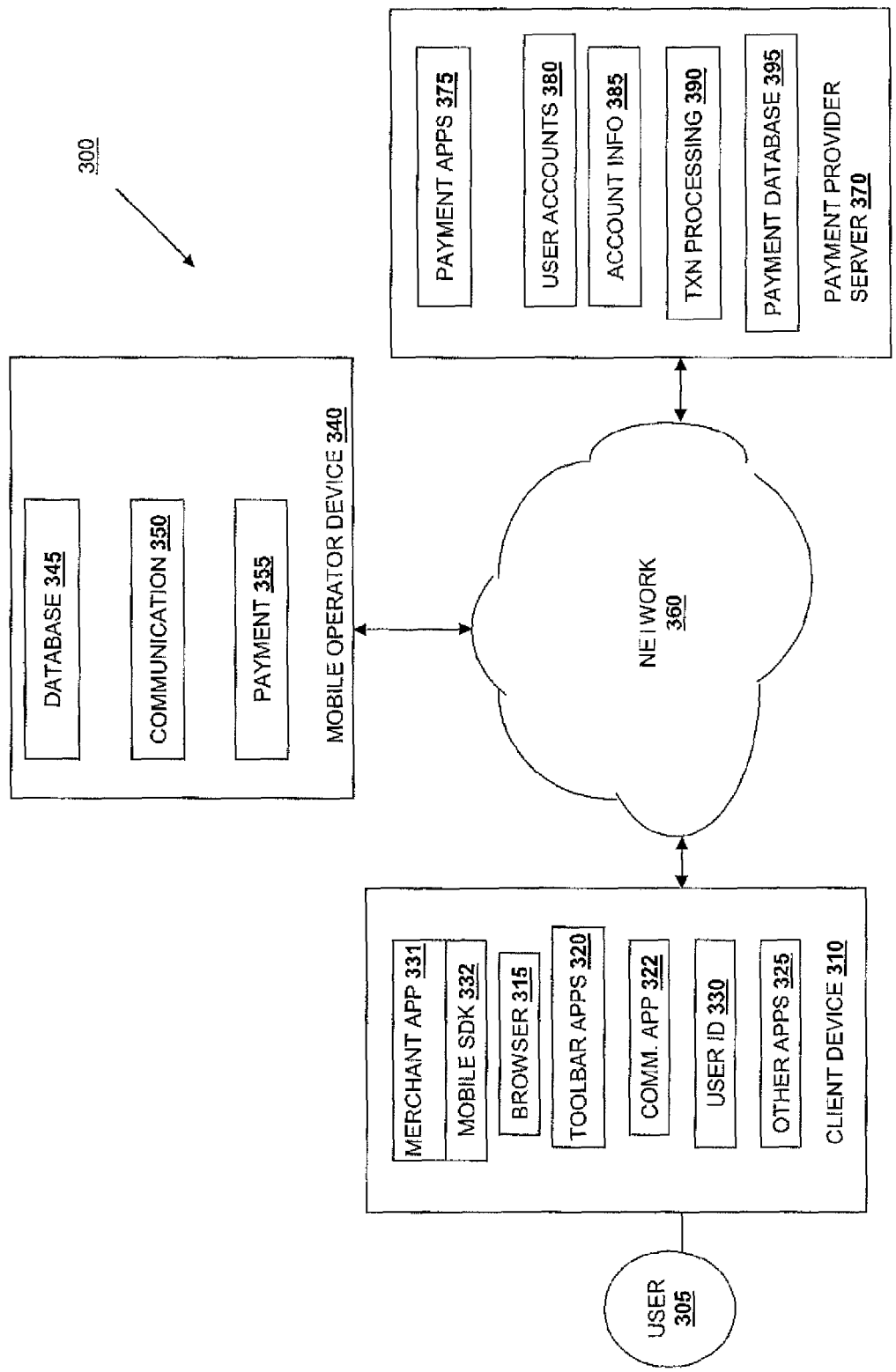
FIG. 3 is a block diagram of a networked system suitable for implementing the processes described herein according to an embodiment.

FIG. 3 is a block diagram of a networked system 300 used in making a payment through a mobile device, such as described above, according to an embodiment of the invention. System 300 includes a user or client device 310, a mobile operator device 340, and a payment service provider server 370 in communication over a network 360. Payment service provider server 370 may be maintained by a payment provider, such as Zong. Server 370 may be maintained by other service providers in different embodiments.

Network 360, in one embodiment, may be implemented as a single network or a combination of multiple networks. For example, in various embodiments, network 360 may include the cloud, the Internet and/or one or more intranets, landline networks, wireless networks, and/or other appropriate types of communication networks. In another example, the network may comprise a wireless telecommunications network (e.g., cellular phone network) adapted to communicate with other communication networks, such as the Internet.

Client device 310, in one embodiment, may be implemented using any appropriate combination of hardware and/or software configured for wired and/or wireless communication over network 360. For example, client device 310 may be implemented as a smart phone of a user 302 (e.g., a client or customer) in communication with network 360. In other examples, client device 310 may be implemented as a computing tablet or other computing devices having communication capabilities through a wireless communication service provider. It should be appreciated that, in various embodiments, client device 310 may be referred to as a user device or a customer/client device without departing from the scope of the present disclosure.

Client device 310, in one embodiment, may include one or more browser applications 322 which may be used to provide a user interface to permit user 302 to browse information available over network 360. For example, browser application 322 may be implemented as a web browser to view information available over network 360. In one implementation, browser application 322 comprises a software program, such as a graphical user interface (GUI), executable by a processor that is configured to interface and communicate with merchant services and payment provider server 370 via network 360. For example, user 302 is able to access mobile apps on the client device to purchase items. User 302, through client device 310, may also communicate with payment provider server 370 to create an account and make payments using an account with the mobile operator.

As such, client device 310, in one embodiment, may include other applications 328 as may be desired in one or more embodiments to provide additional features available to user 302, including selecting items for purchase and making payments with payment provider server 370 using an account with the mobile operator. For example, applications 328 may include interfaces, apps, and communication protocols that allow the user to receive and transmit information through online sites and payment provider server 370. Applications 328 may also include security applications for implementing client-side security features, programmatic client applications for interfacing with appropriate application programming interfaces (APIs) over network 360 or various other types of generally known programs and/or applications. Client device 310 may also include a location application that enables the location of the client device to be determined and conveyed to others, such as a payment provider. Such applications are commonly known.

Client device 310 also includes one or more merchant apps 331 that allow the user to access such apps to make purchases from the merchant through a specific merchant app. Each merchant app 331 may also include a mobile SDK provided by the payment provider, which can be installed or downloaded into the merchant app. The mobile SDK app allows user 302 to make a one-touch payment through client device 310, with the funding instrument being a user account with the mobile operator.

Mobile operator device 340 may be maintained by one or more wireless service providers offering voice and data communication services to user 302 through client device 310. Mobile operator device 340, which can be a server, may include a database that stores user account information, such as a user phone number, calls made to and from the number, charges incurred on the account, payments made to and from the account, etc. User account information may also include limitations or restrictions placed on the account by the user and/or the mobile operator.

A communication application 350 enables mobile operator device 340 to communicate with payment provider server 370 and client device 310, including providing communication services for client device 310. A payment application 355 may be used to handle payments and charges to and from user mobile accounts, including storing payment records, determining payment issues, etc.

Payment provider server 370, in one embodiment, may be maintained by a payment provider, which may provide processing for financial transactions on behalf of user 302 with a merchant. Payment provider server 370 includes one or more payment applications 375 which may be configured to interact with user device 310 and/or mobile operator device 340 over network 360 to facilitate the purchase of goods or services, communicate/display information, and make payments by user 305 of user device 310 and as discussed above.

Payment provider server 370 also maintains a plurality of user accounts 380, each of which may include account information 385 associated with individual users. For example, account information 385 may include financial information of users of devices such as account numbers, passwords, device identifiers, user names, phone numbers, credit card information, bank information, or other financial information which may be used to facilitate payment transactions by user 305. Advantageously, payment application 375 may be configured to interact with mobile operator device 340 on behalf of user 305 during a transaction through merchant app 331 for a payment using an account with the mobile operator.

A transaction processing application 390, which may be part of payment application 375 or separate, may be configured to receive information from a user device and/or mobile operator device 340 for processing and storage in a payment database 395. Transaction processing application 390 may include one or more applications to process information from user 305 for processing an order and payment as described herein. Payment application 375 may be further configured to determine the existence of and to manage accounts for user 305, as well as create new accounts if necessary, including obtaining user device information, such as a phone number to associate with an account.

Figure 4:
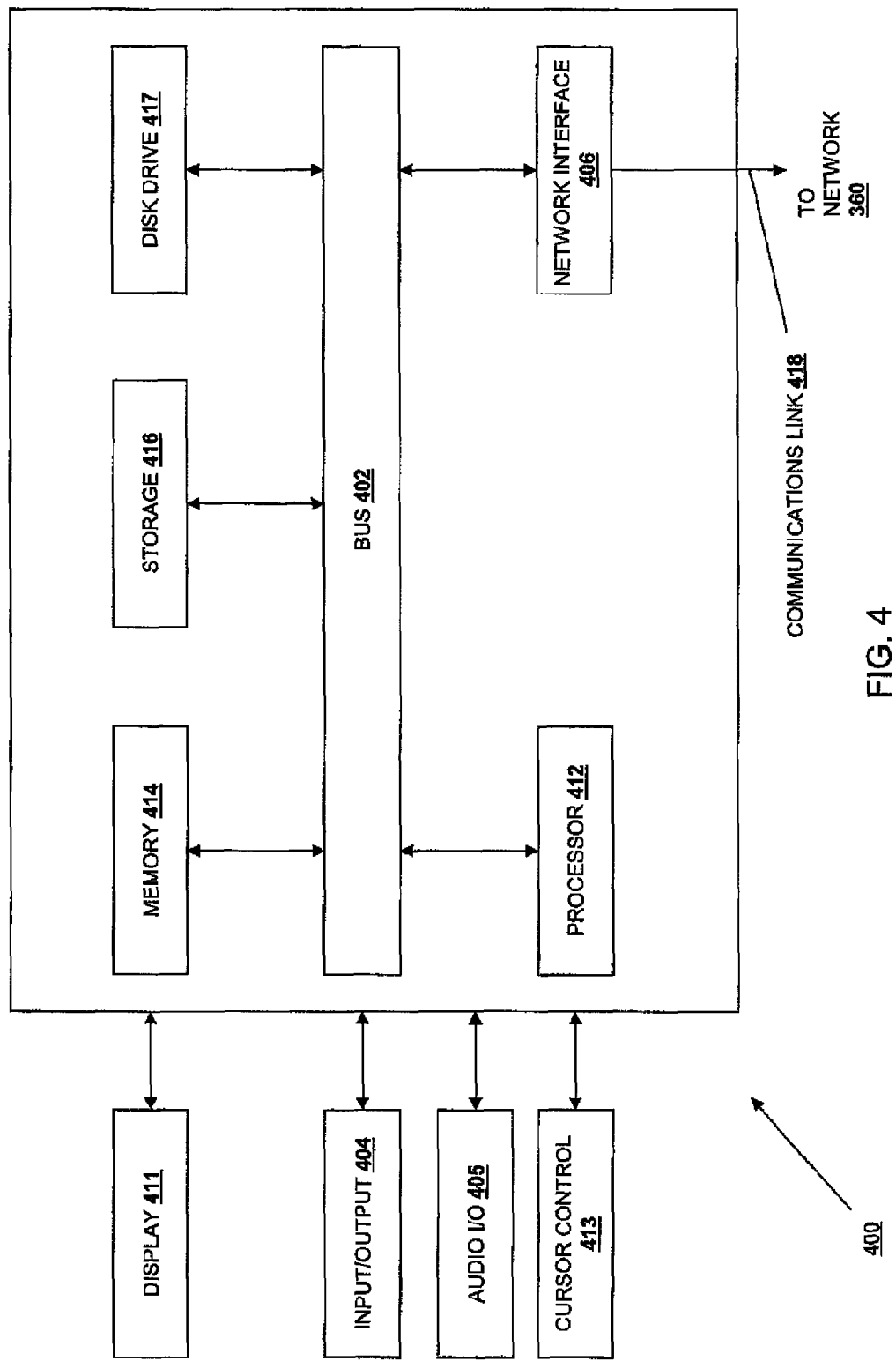
FIG. 4 is a block diagram of a computer system suitable for implementing one or more components in FIG. 3 according to one embodiment of the present disclosure.

FIG. 4 is a block diagram of a computer system 400 suitable for implementing one or more embodiments of the present disclosure, including client device 310, mobile operator device 340, and payment provider server 370. In various implementations, the user device may comprise a personal computing device (e.g., a personal computer, laptop, smart phone, PDA, etc.) capable of communicating with the network. The merchant and/or payment provider may utilize a network computing device (e.g., a network server) capable of communicating with the network. It should be appreciated that each of the devices utilized by users, merchants, and payment providers may be implemented as computer system 400 in a manner as follows.

In accordance with various embodiments of the present disclosure, computer system 400, such as a personal computer and/or a network server, includes a bus 402 or other communication mechanism for communicating information, which interconnects subsystems and components, such as a processing component 404 (e.g., processor, micro-controller, digital signal processor (DSP), etc.), a system memory component 406 (e.g., RAM), a static storage component 408 (e.g., ROM), a disk drive component 410 (e.g., magnetic or optical), a network interface component 412 (e.g., modem or Ethernet card), a display component 414 (e.g., CRT or LCD), an input component 416 (e.g., keyboard, keypad, or virtual keyboard), and a cursor control component 418 (e.g., mouse, pointer, or trackball). In one implementation, disk drive component 410 may comprise a database having one or more disk drive components.

In accordance with embodiments of the present disclosure, computer system 400 performs specific operations by processor 404 executing one or more sequences of instructions contained in system memory component 406, such as described above with respect to the user, merchant, and/or payment provider in FIGS. 1 and 2. Such instructions may be read into system memory component 406 from another computer readable medium, such as static storage component 408 or disk drive component 410. In other embodiments, hard-wired circuitry may be used in place of or in combination with software instructions to implement the present disclosure.

Logic may be encoded in a computer readable medium, which may refer to any medium that participates in providing instructions to processor 404 for execution. Such a medium may take many forms, including but not limited to, non-volatile media, volatile media, and transmission media. In one embodiment, the computer readable medium is non-transitory. In various implementations, non-volatile media includes optical or magnetic disks, such as disk drive component 410, volatile media includes dynamic memory, such as system memory component 406, and transmission media includes coaxial cables, copper wire, and fiber optics, including wires that comprise bus 402. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by a communication link 420 to the network (e.g., such as a LAN, WLAN, PTSN, and/or various other wired or wireless networks, including telecommunications, mobile, and cellular phone networks) may perform instruction sequences to practice the present disclosure in coordination with one another.

Computer system 400 may transmit and receive messages, data, information and instructions, including one or more programs (i.e., application code) through communication link 420 and a communication interface 412. Network interface component 412 may include an antenna, either separate or integrated, to enable transmission and reception via communication link 420. Received program code may be executed by processor 404 as received and/or stored in disk drive component 410 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

What is claimed is:

1. A system comprising:
  a memory storing user account information, wherein the information comprises a mobile phone number for a user account; and
  one or more processors for
  receiving, by a third party payment provider, a payment request from a merchant application on a user mobile device, wherein the payment request comprises a phone number for the user mobile device and a payment amount;
  verifying, by the third party payment provider, the phone number with a user account with the third party payment provider, comprising generating, by the third party payment provider, a one-time token, transmitting, by the third party payment provider, the one-time token to the user mobile device, and receiving, by the third party payment provider, the one-time token from the user mobile device;
  transmitting the payment request, by the third party payment provider, to a mobile operator providing wireless communication services for the user mobile device;
  receiving, by the third party payment provider, an approval or decline notification determined by and from the mobile operator;
  processing, by the third party payment provider, the payment request upon receiving the approval, wherein the processing comprises charging the payment amount to an account of the user with the mobile operator; and
  transmitting, by the third party payment provider, a notification to the user mobile device.

2. The system of claim 1, wherein the payment request is received from a mobile software development kit (SDK) installed in the merchant application.

3. The system of claim 1, wherein the one-time token comprises a unique identifier associating the payment request with the token.

4. A non-transitory machine-readable medium comprising a plurality of machine-readable instructions which when executed by one or more processors of a server are adapted to cause the server to perform a method comprising:
- receiving, by a third party payment provider, a payment request from a merchant application on a user mobile device, wherein the payment request comprises a phone number for the user mobile device and a payment amount;
- verifying, by the third party payment provider, the phone number with a user account with the third party payment provider comprising generating, by the third party payment provider, a one-time token, transmitting, by the third party payment provider, the one-time token to the user mobile device, and receiving, by the third party payment provider, the one-time token from the user mobile device;
- transmitting the payment request, by the third party payment provider, to a mobile operator providing wireless communication services for the user mobile device;
- receiving, by the third party payment provider, an approval or decline notification determined by and from the mobile operator;
- processing, by the third party payment provider, the payment request upon receiving the approval, wherein the processing comprises charging the payment amount to an account of the user with the mobile operator; and
- transmitting, by the third party payment provider, a notification to the user mobile device.

5. The non-transitory machine-readable medium of claim 4, wherein the payment request is received from a mobile software development kit (SDK) installed in the merchant application.

6. The non-transitory machine-readable medium of claim 4, wherein the one-time token has a unique identifier associating the payment request with the token.

7. The non-transitory machine-readable medium of claim 4, wherein the notification is transmitted to the merchant application.

8. A method comprising:
- receiving, electronically by a processor of a third party payment provider, a payment request from a merchant application on a user mobile device, wherein the payment request comprises a phone number for the user mobile device and a payment amount;
- verifying, electronically by the third party payment provider, the phone number with a user account with the third party payment provider comprising generating, by the third party payment provider, a one-time token, transmitting, by the third party payment provider, the one-time token to the user mobile device, and receiving, by the third party payment provider, the one-time token from the user mobile device;
- transmitting, electronically by the third party payment provider, the payment request, by a payment provider, to a mobile operator providing wireless communication services for the user mobile device;
- receiving, electronically by the third party payment provider, an approval or decline notification determined by and from the mobile operator;
- processing, by the third party payment provider, the payment request upon receiving the approval, wherein the processing comprises charging the payment amount to an account of the user with the mobile operator; and
- transmitting, electronically by the third party payment provider, an electronic notification to the user mobile device.

9. The method of claim 8, wherein the payment request is received from a mobile software development kit (SDK) installed in the merchant application.

10. The method of claim 8, wherein the one-time token has a unique identifier associating the payment request with the token.

11. The method of claim 8, wherein the notification is transmitted to the merchant application.

* * * * *